United States Patent [19]

Schmitt et al.

[11] Patent Number: 4,818,976

[45] Date of Patent: Apr. 4, 1989

[54] DEVICE FOR MONITORING HYDROCARBONS IN GROUNDWATER

[75] Inventors: Paul W. Schmitt, Pittsburgh; Charles W. Gardner, Jr., Gibsonia, both of Pa.

[73] Assignee: Mine Safety Appliances Company, Pittsburgh, Pa.

[21] Appl. No.: 19,196

[22] Filed: Feb. 26, 1987

[51] Int. Cl.$^4$ ............................................... G08B 21/00
[52] U.S. Cl. ..................................... 340/605; 340/622; 73/304 R; 73/49.2
[58] Field of Search ............... 340/620, 621, 622, 632, 340/605; 73/49.2 T, 26, 304 R

[56] References Cited

U.S. PATENT DOCUMENTS

| | | | |
|---|---|---|---|
| 3,939,470 | 2/1976 | Arai et al. | 340/622 X |
| 4,517,161 | 5/1985 | Gravina et al. | 340/634 X |
| 4,561,292 | 12/1985 | Pugnole et al. | 340/605 X |
| 4,609,913 | 9/1986 | Arbogast et al. | 340/622 |
| 4,618,855 | 10/1986 | Harding et al. | 340/605 |
| 4,656,464 | 4/1987 | Cliffgard | 340/622 |
| 4,663,614 | 5/1987 | Rauchwerger | 340/605 |

Primary Examiner—Joseph A. Orsino
Assistant Examiner—Jeffery A. Hofsass
Attorney, Agent, or Firm—Douglas K. McClaine

[57] ABSTRACT

An apparatus for sensing the leakage of hydrocarbons from underground storage tanks having a hydrocarbon vapor sensor, a liquid sensor to determine the level of the groundwater and the positioning of the vapor sensor; and, alarm and trouble circuitry to indicate the presence of a hydrocarbon leak or a malfunctioning circuit. The apparatus also contains a timer mechanism to accurately determine whether or not the hydrocarbon has actually leaked from an underground storage tank or is present in the test area due to natural gases or above-ground spills.

2 Claims, 3 Drawing Sheets

SINGLE WALL TANK APPLICATION

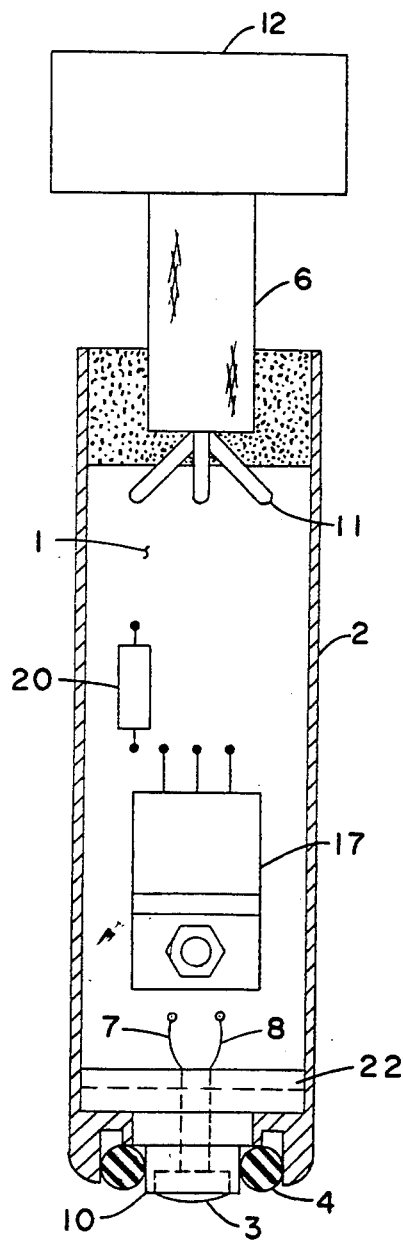
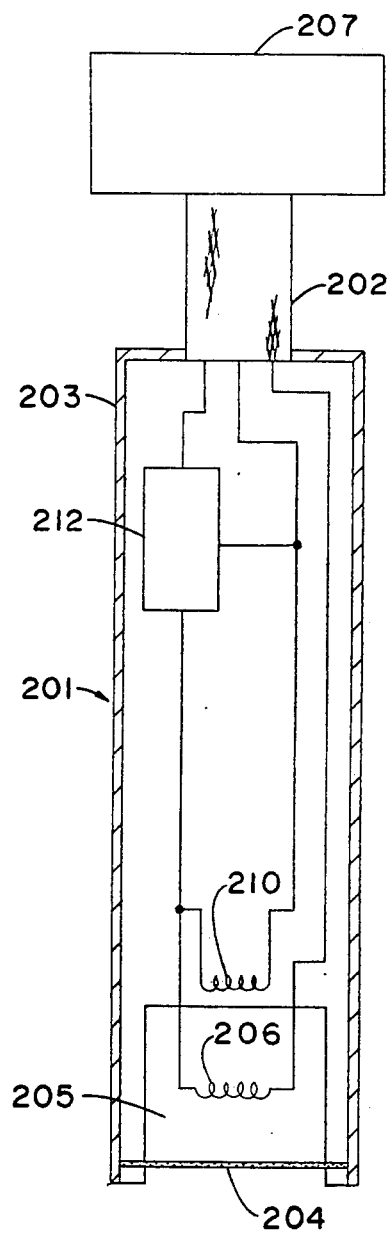
FIG. 1
FIG. 2

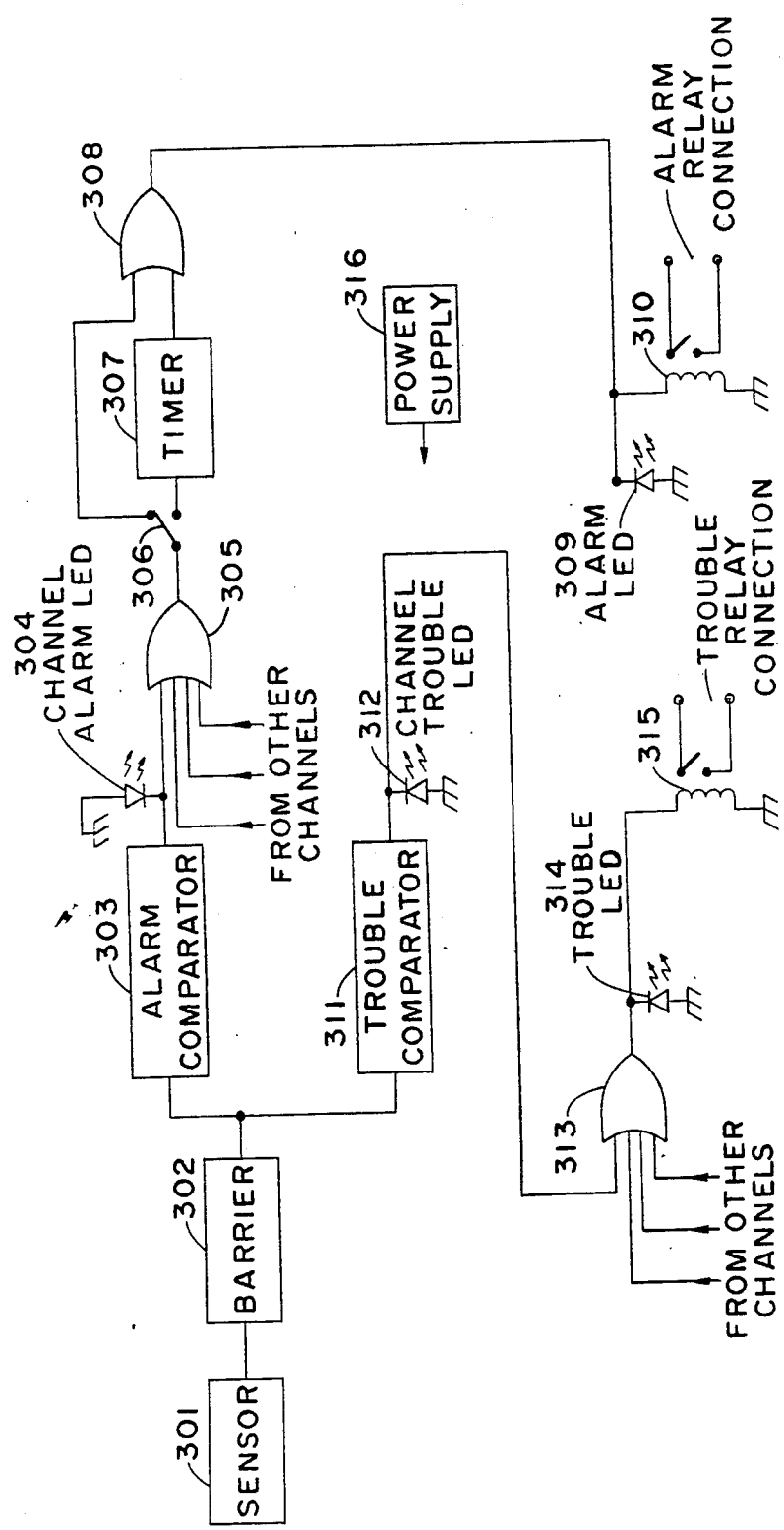
FIG. 3 - TANKGARD CONTROL UNIT BLOCK DIAGRAM

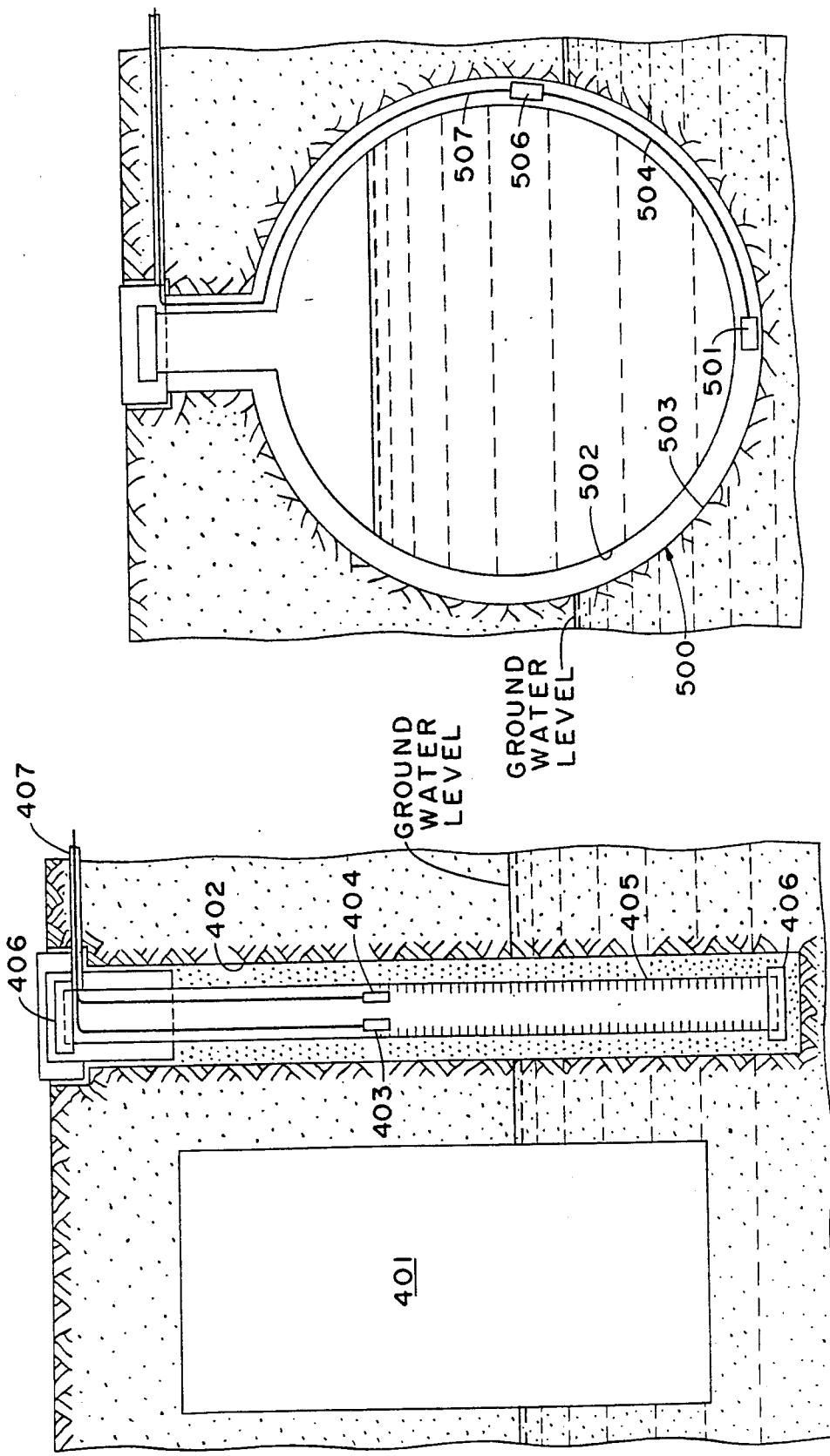

DEVICE FOR MONITORING HYDROCARBONS IN GROUNDWATER

BACKGROUND OF THE INVENTION

This invention relates to an instrument that can be used to detect leaks in underground storage containers. Underground storage tanks are currently being used to store gasoline, oils, petroleum products, chemicals, and other toxic substances. It is preferred to store these substances underground in order to insulate the substances from the public and prevent accidental spills or leaks from the tank into the air or onto the ground.

As more and more of these underground containers are placed below the surface of the ground, there is an increasing concern over leaks from the tanks into the soil and groundwater. Since the tanks are buried underground, it is impossible to detect a leak in the tank by visual inspection. It is the object of this invention to provide an apparatus that can detect leaks from the tanks into the soil and groundwater and then sound an alarm to warn the owner of the tanks.

SUMMARY OF THE INVENTION

The invention incorporates two separate and distinct sensors that simultaneously relay information to a control/alarm unit. The invention can be used in one of two ways. The sensors can either be lowered into vertical shafts that have been drilled into the ground around underground tanks having single-walled construction, or the sensor can be inserted between the outer and inner walls of underground tanks that have double-walled construction to detect leaks from inside or outside the tank.

In either application, the apparatus used to detect leaks from underground storage tanks comprises a hydrocarbon vapor sensor and a liquid sensor that are connected to a control/alarm unit by electric cables. The sensors are suspended by the cables and positioned by raising and lowering the cables. The apparatus can detect leaks in underground storage tanks that contain petroleum or petroleum products. Two sensors must be used since the vapor sensor will not function properly if it is submerged in a liquid. Thus, the liquid sensor must be used to locate the liquid level in the test area so that the vapor sensor can be positioned above the liquid level. After the liquid sensor has been lowered into the well or inside of the walls of the tank to determine the level of liquid present in the test area, the vapor sensor is lowered into the test area until it is positioned just above the liquid level.

Since the vapor sensor functions by sensing diffused gases that emanate from the liquid, its sensitivity is altered by submerging the sensor in a liquid. When the vapor sensor senses the presence of a hydrocarbon in the test area, a signal is sent back to an alarm unit warning the tank owner.

BRIEF DESCRIPTION OF THE DRAWINGS

FIG. 1 is a cross sectional view and circuit diagram of the liquid sensor.

FIG. 2 is a cross sectional view and circuit diagram of the vapor sensor.

FIG. 3 is a schematic block diagram of the control/alarm unit.

FIG. 4 is an arrangement diagram of one application of the apparatus when being used to sense leakage from a single wall underground storage tank.

FIG. 5 is an arrangement diagram of one application of the apparatus when being used to sense leakage from a double-wall underground storage tank.

DETAILED DESCRIPTION OF THE PREFERRED EMBODIMENT

The invention is comprised of three main parts, a vapor sensor, a liquid sensor, and a control/alarm unit. Referring first to FIG. 1, a cross sectional view and circuit diagram of the liquid sensor are shown.

Signal wires 11 contained by cable 6 interconnect circuit board 1 and the control/alarm unit 12 through one end of sensor casing 2. A thermistor 3 is attached to circuit board 1 by two leads 7 and 8. The thermistor 3 is positioned in a thermally conductive epoxy 10 that has been poured into a plastic mold 22 to hold the epoxy until it hardens around the thermistor 3. After the epoxy hardens, the plastic mold 22 is mounted at the opposite end of the sensor casing 2 from cable 6. The epoxy 10 is surrounded by an O-ring 4 to thermally insulate the epoxy 10 from the casing 2. The epoxy 10 containing the thermistor 3 is exposed to the surrounding atmosphere around the casing 2.

Before the liquid sensor is lowered into the test area, the thermistor 3 is self-heated to a high temperature by applying a voltage from the contral/alarm unit across leads 7 and 8. The voltage is controlled by a voltage regulator 17 and regulating resistor 20. A preferred value of the regulating resistor 20 is, for example, 510 ohms. The voltage regulator 17 insures a constant voltage is applied to the thermistor 3 and regulating resistor 20 regardless of the length of line from the control module. If the regulator 17 was not present, the characteristics of the thermistor 3 and regulating resistor 20 would change as the length of line varied from one sensor to another. The amount of current that passes from the voltage regulator 17 to the thermistor 3 is reduced by the regulating resistor 20. The regulating resistor 20 allows sufficient current to pass through the thermistor 3 to elevate the temperature while limiting the current seen by the thermistor 3 so as to prevent destruction of the thermistor 3. After self-heating, the thermistor 3 in turn heats the surrounding epoxy 10. The O-ring 4 prevents heat from being transferred from the epoxy to the casing 2. The heated epoxy 10 loses heat at the same BTU rate as the thermistor 3. The change in resistance in the thermistor 3 is directly proportional to the amount of heat loss in the thermistor 3. By measuring the resistance in the thermistor 3, the operator can determine when the thermistor has contacted a liquid since the heat transfer from the epoxy 10 and thermistor 3 occurs at a different rate when the sensor is immersed in air than when the sensor is submersed in a liquid. Since the heat loss and hence the resistance change occurs very rapidly when the sensor is submersed in a liquid the operator can quickly determine when the sensor has been withdrawn from the liquid. By raising and lowering the sensor, the exact level of the liquid, if any, can be determined. Applicant's liquid sensor provides an advantage over the liquid sensors already known in the art in that applicant's sensor uses electrical circuitry rather than a float mechanism. For this reason, applicant's liquid sensor can be used regardless of the orientation of the sensor. This allows the sensor to be positioned sideways between the outer and inner walls of an underground storage tank. Further, because of the use of circuitry, rather than a float, applicant's sensor is very durable permitting the sensor to be used in rugged industrial applications.

Once the liquid level has been determined, the vapor sensor is then lowered into the test area until it is just above the location of the liquid sensor. An exact position can be calculated by measuring the amount of cable required to lower the liquid sensor to the water line and lowering the vapor sensor and cable that is just shorter than the cable used for the liquid sensor.

Referring now to FIG. 2, a cross sectional view of the vapor sensor is shown.

The vapor sensor 201 is interconnected with the control/alarm unit 207 by cable 202. One end of the cable 202 is connected to a metal casing 203 that contains a solid state tin oxide combustible gas sensing element 206 of the type manufactured by Figaro Engineering Co. The tin oxide element 206 is separated from the test atmosphere by an air gap 205 and a hydrophobic porous membrane 204. The air gap 205 traps the hydrocarbon vapors that permeate the membrane 204. The tin oxide element 206 then senses the trapped hydrocarbon vapors inside of the air gap. The hydrophobic membrane material can be, for example, Goretex.

The vapor sensor 201 is similar in arrangement to the sensor described in Klass, U.S. Pat. No. 3,864,628. However, applicant's sensor differs from the sensor described by Klass in that the membrane of applicant's sensor is non-selective to the hydrocarbon vapors being detected and does not require time-delay circuitry.

Referring now to the schematic diagram contained in FIG. 2, the vapor sensor 201 has an internal heater 210 that elevates the temperature of the tin oxide sensing element 206. The sensing element 206 is placed in series with a voltage regulator 212. The voltage regulator 212 regulates the voltage to enable the sensing element 206 to function correctly regardless of the length of cable extending from the control module 207 to the sensing element 206. The sensing element 206 changes its resistance when the gas concentration surrounding the sensing element 206 changes. This change in resistance changes the amount of current that flows through the sensing element 206. This current change is detected by the control module 207 and is converted to a voltage signal.

As the test sample of the atmosphere fills the cup-shaped casing 203, vapors pass through the membrane 204 and into the air gap 205 where the tin oxide sensor 206 is in direct communication with the air gap 205. When the tin oxide sensor 206 detects a combustible hydrocarbon in the test vapor, the resistance in the sensing element 206 changes resulting in a fluctuation of voltage. The change in voltage produces an electrical signal that is sent to the control/alarm unit 207 along the signal wires (not shown) of the cable 202 producing an alarm or warning signal indicating the presence of hydrocarbon vapors and a probable leak.

The membrane 204 is non-specific and will therefore, permit any gas vapor to pass through it. When the control/alarm unit 207 receives the electrical signal, an alarm is generated. The control/alarm unit 207 can be any electrical circuitry that generates an alarm when an electrical signal is received.

Referring now to FIG. 3, a schematic diagram of the third main part of the invention is shown. The third main part of the invention is the control/alarm unit. The control/alarm unit contains the necessary circuitry to provide alarm and warnings to maintenance personnel upon receiving signal inputs from either the vapor sensor or the liquid sensor. The control/alarm unit operates in accordance with the following description.

The following components shown on the circuit diagram in FIG. 3 are normally built on one circuit board. A sensor 301 either liquid or vapor type is attached to the control unit by terminal blocks of the circuit board. The first component that is encounter in the circuit is a barrier circuit 302. Standard barrier circuits, known in the art are composed of resistors and zener diodes which enable the control/alarm unit and sensors to be intrinsically safe for National Electric Code, Class I, Division I, Group Code D. The function of the barrier circuit 302 is to limit the amount of energy that is transferred to the sensors 301 so as to prevent ignition and explosion in atmospheres of gasoline or other combustibles. The barrier circuit limits both the current and voltage that is sent to the sensor 301. Thus, if a sensor is removed or a sensor wire is shorted, the barrier circuit 302 will not permit an energy transfer great enough to cause an ignition and resultant explosion.

As the sensor signal passes through the barrier circuit 302, the signal is divided into two paths. One path proceeds into an alarm circuit while the second path proceeds into a "trouble" circuit. Both the alarm and trouble circuit work simultaneously.

The alarm circuitry is comprised of a voltage comparator 303 (hereinafter referred to as an "alarm comparator"), an alarm channel LED 304 and an OR gate 305. The first component that is encountered in the alarm circuit is the alarm comparator 303. The alarm comparator 303 compares the voltage generated by a potentiometer (not shown) that is connected to the alarm comparator 303. The potentiometer input is adjustable so that the voltage can be varied. The potentiometer is located inside of the control unit on the circuit board. There is one potentiometer for each sensor channel.

The alarm comparator 303 now sees two input signals. If the input signal from the sensor 301 exceeds the potentiometer voltage, a signal is generated and channel alarm LED 304, that is located on the circuit board inside of the control housing, becomes illuminated.

The purpose of the individual channel LED 304 is to show the operator exactly which sensor has caused the alarm. This will enable the operator to quickly determine the position of the gas leaks. If the sensor signal does not exceed the potentiometer setting, there is no signal generated by the comparator 303.

After the channel LED indicator is illuminated, the signal passes into an OR gate 305. At the same time, signals from all of the other sensors continually pass into the same OR gate 305. The OR gate 305 is energized when any one ore more of the alarm comparators generates a signal in input. This function is such that any alarm signal input to the OR gate 305 will produce an output.

The output from the OR gate then proceeds to a manually operated switch 306 that can be used to by-pass an integrated circuit 307 that acts as both a clock and a counter used to monitor the signals generated by the alarm comparator 303 (hereinafter referred to as a "timer"). The function of the timer 307 will be described hereinafter.

If the timer 307 is bypassed the alarm signal that emanates from the OR gate 305 proceeds directly to a second OR gate 308 that is used as a signal generator that functions whenever a signal from the timer 307 or from the first OR gate 305 enters the second OR gate 308. Alternatively, if the alarm signal is directed via switch 306 to the timer 307, the timer 307 functions so as to count the ticks of the clock function of the circuit. The clock ticks at a rate of 80 ticks/second. When the counter reads 864,000 ticks, indicating a three-hour time period, an alarm signal is generated that proceeds to OR gate 308. If the timer does not receive a continuous signal from the sensor for the entire three-hour period, the counter starts over when an alarm signal is next received. The timer 307, taken in combination with the other circuit components, produces a signal cancellation scheme unique to applicant's invention.

The purpose of the timer 307 and hence the cancellation scheme is to prevent false alarms that may be generated by the vapor sensors. The cancellation scheme works in the following manner. The vapor sensor responds to hydrocarbon vapors in the test atmosphere from any source. Therefore, the sensor will signal the presence of hydrocarbon vapors from leaks in the tank, above ground spills or any other natural source.

It is a characteristic of natural sources of hydrocarbons and of hydrocarbon spills from the surface that the vapors will dissipate in a short period of time. In contrast, a leak from an underground storage tank does not dissipate quickly, since the source of hydrocarbon continually replenishes the leak area. The cancellation scheme uses these characteristics to distinguish between a continuous leak and a natural or above ground source of hydrocarbon vapors.

When the timer 307 is activated by switching the path of the alarm signal via the switch 306, the timer 307 counts the number of alarm signals generated over the three hour period. In order to activate the alarm, the timer 307 must receive an alarm signal for three continuous hours. During this three-hour period, natural sources of hydrocarbon vapors will dissipate and the alarm signal would cease to be generated and sent to the timer. A tank leak, however, will continue to increase the concentration of the hydrocarbon vapors and the timer input will sense the presence of an alarm signal for the entire three-hour period. This is how the cancellation scheme distinguishes between a tank leak and a natural source of hydrocarbon vapors.

If the timer senses a continuous signal for a three-hour period, another signal is generated by the timer. This signal then activates a general alarm LED 309 that is located on the front of the control panel box. This same signal can also be used to sound a horn or buzzer or any other type of electrically activates signaling device. When the general alarm LED 309 is activated, an alarm relay 310, connected in parallel with the general alarm LED 309 is simultaneously activated. The relay 310 can be used to operate any number of electrically controlled devices such as, for example, alarm horns, lights, message senders, etc. This completes the alarm circuit.

The second aforementioned circuit path that exits the barrier circuit 302 is called the trouble circuit. The signal that exits the barrier circuit flows to a second voltage comparator 311 (hereinafter referred to as a "trouble comparator"). The trouble comparator 311 compares the input signal from the barrier circuit 302 to two non-adjustable voltage valves that have been pre-set in the trouble comparator 311. The two pre-set values correspond to the voltage of the trouble signal if the sensor input is shorted or open. A shorted or open sensor signal could be caused by leaks in the sensor, crossed on bare wires, etc. If the voltage of the sensor input is the same as one of these pre-set valves, a signal is generated by the trouble comparator 311. This signal then activates a channel trouble LED of that particular channel 312 located inside of the control panel case, and then proceeds to OR gate 313. Trouble signals from all of the other signals are joined at the same OR gate 313. When the OR gate 313 reads one or more trouble signals, a signal is generated by the OR gate that activates a main trouble LED 314 that is located on the front panel of the control unit. When the main trouble LED 314 is activated, a trouble relay connection 315 is simultaneously activated. The trouble relay contacts can be wired to activate an alarm (not shown) or warning device (not shown).

Also shown is a power supply 316. The power supply 316 provides the necessary power for all of the circuitry and sensors. The input power to the power supply 316 can be either 110 or 220 volts AC at 50 to 60 Hz. The operator connects the power supply 316 to terminal blocks (not shown) on the circuit board. The output of the power supply is reduced via a transformer (not shown) so that the voltage leaving the transformer provides twelve volts to the sensors and five volts to the other electrical components of the circuit. The output of the transformer is connected to every electrical component of the circuit that requires power.

Referring now to FIG. 4, the apparatus is shown being used to monitor hydrocarbon leaks from a single wall underground storage tank 401. First, four wells identical to well 402 are drilled into the ground around the outer perimeter of the storage tank 401. A perforated casing 405, having two end caps 406 is lowered into the well 402. The casing can be, for example a perforated pipe that will admit liquids to its interior. First, a liquid sensor 403 is lowered into the casing 405 through one of two holes in the top casing cap 406. The liquid sensor is lowered via cable 407 until the sensor indicates the groundwater level inside of the casing 405. Next, a vapor sensor 404 is lowered into the casing 405 until it is approximately one foot above the groundwater level. The vapor sensor 404 is admitted into the casing 405 via the second hole in the top cap 406 of the casing 405. The conduit cable runs from the liquid sensor 403 and the vapor sensor 404, through the two holes in the top casing cap 406 and is connected to the control/alarm unit at a remote location (not shown).

Referring now to FIG. 5, the apparatus is shown being used to monitor hydrocarbon leaks into or out of a double walled underground storage tank. First, a liquid sensor 501 is lowered into the air gap between the inner wall 502 and the outer wall 503 of the storage tank 500. The liquid sensor 501 is lowered via cable 504. The liquid sensor 501 is lowered until is senses the level of liquid between the walls of the tank. Next, a vapor sensor 506 is lowered via cable 507 between the walls of the tank until it is positioned approximately one foot above the liqquid sensor 501. The other ends of the cables 504 and 507 run out of the top of the gap between the tank walls and to the control/alarm unit that has been located at a remote position (not shown). This arrangement of sensors in a double wall tank will detect leaks from inside or outside of the tank in the following manner. When a leak occurs from inside of the tank into the space between the walls, the liquid sensor will sense the liquid and the vapor sensor will similarly sense the presence of a hydrocarbon and both sensors will alarm. If a leak occurs from outside of the tank into the gap between the tank walls, the liquid sensor will detect the presence of a liquid while the vapor sensor will not respond. Since only one sensor responds, the operator can quickly determine how the leakage is occurring.

It is to be understood that the invention can be used in many other configurations and that the described embodiment is merely illustrative of the present invention.

We claim:

1. An apparatus for monitoring leakage of hydrocarbons from an underground storage tank comprising:
   a hydrocarbon vapor sensor of the tin-oxide variety that is located in an underground test area and capable of sensing the presence of a hydrocarbon in said underground test area and having means to connect said vapor sensor by a first electrical cable to send signals to a signal receiving circuitry,
   a liquid level sensor that generates an electrical signal in response to contact with a liquid having means to connect said liquid sensor by a second electrical cable to send signals to a remote signal receiving circuitry, said liquid level sensor used to position said hydrocarbon vapor sensor a predetermined height above a sensed liquid level,
   remote signal receiving circuit means connected by a third cable to power said sensors and where said circuit receives said signals and generates an alarm signal when the hydrocarbon vapor exceeds a predetermined amount or the liquid sensor contacts a liquid,
   timer circuit means to delay the alarm until said alarm signal is received continuously for a pre-determined period of time.

2. An apparatus according to claim 1 having circuitry comprising a voltage comparator and a plurality of LED's where said LED's are activated when said voltage comparator compares the incoming sensor signal voltage to a pre-determined voltage, to show the existence of either a short circuit or an open circuit.

* * * * *